(12) United States Patent
Sundaram P

(10) Patent No.: US 10,120,915 B2
(45) Date of Patent: Nov. 6, 2018

(54) INTEGRATED FRAMEWORK FOR SECURED DATA PROVISIONING AND MANAGEMENT

(71) Applicant: SAP SE, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 518 days.

(21) Appl. No.: 14/953,003

(22) Filed: Nov. 26, 2015

(65) Prior Publication Data

US 2017/0154083 A1    Jun. 1, 2017

(51) Int. Cl.
  *G06F 17/30* (2006.01)
  *G06Q 10/06* (2012.01)

(52) U.S. Cl.
  CPC .. *G06F 17/30554* (2013.01); *G06F 17/30477* (2013.01); *G06F 17/30569* (2013.01); *G06Q 10/063* (2013.01)

(58) Field of Classification Search
  CPC ................................................ G06F 17/30554
  USPC ................................ 707/722, 602; 709/247
  See application file for complete search history.

(56) References Cited

U.S. PATENT DOCUMENTS 5,737,592 A     4/1998  Nguyen
8,041,760 B2 *  10/2011 Mamou ............. G06F 17/30563
                                                   707/602
2009/0307249 A1* 12/2009 Koifman ............... G06F 3/0623
                                                   707/999.101
2015/0256603 A1*  9/2015 Pillai ...................... H04L 67/10
                                                   709/246

OTHER PUBLICATIONS

European Search Report for EP Application No. 16198844.9-1952, dated Apr. 7, 2017, 11 pages; EPO, Munich, Germany.
Meenakshi Sundaram P; Integrated Framework for Data Management and Provisioning; U.S. Appl. No. 14/621,382, filed Feb. 13, 2015, p. 1-57; USPTO.

* cited by examiner

*Primary Examiner* — Chelcie L Daye
(74) *Attorney, Agent, or Firm* — Buckley, Maschoff & Talwalkar LLC

(57) ABSTRACT

Methods and system are disclosed that provision contextual information associated with business data. In one aspect, a framework middleware receives a request via an application to establish connection. Upon processing the request, the application may establish connection with multiple databases associated with multiple business management systems via an adapter framework associated with the framework middleware. Based on the established connection, the business data from the multiple databases maybe retrieved via a real-time provisioning adapter framework associated with the framework middleware. Multiple routines in the framework middleware may be executed to trigger a system landscape transformation model to transform the retrieved business data. Based on parameters associated with the transformed business data, associated contextual information maybe determined. The determined contextual information may be provisioned by rendering the contextual information on a user interface.

17 Claims, 14 Drawing Sheets

| HOME | PRODUCTS & SOLUTIONS | ENABLEMENT & LEARNING | PARTNER CONNECT | NEWS & EVENTS |

WELCOME STEFAN ⌄   MY FAVORITES ⌄   ENGLISH ⌄   SUPPORT   LOGOUT

PARTNER

SEARCH PARTNER 806

808   810   812   814   816

PARTNER INFORMATION          COMPANY INFORMATION          PROFILE & SETTINGS 818

STEFAN FITSCH
SOLUTION CONSULTANT

E-MAIL / USER ID: S.FITSCH@SUMMIT.COM
PARTNER TYPE: VALUE ADDED RESELLER
REGION: EUROPE
SOLUTION AUTHORISATION: SAP ALL-IN-ONE
LANGUAGES: GERMAN
ENGLISH

SUMMIT SOLUTIONS

PROFESSIONAL SERVICES, HIGH TECH    LOB:    MANUFACTURING
COUNTRY:       DENMARK              PROGRAM LEVEL:    GOLD
STREET:        ASIATISK PLADS       SOLUTION AUTHORISATION: ALL-IN-ONE
POSTAL CODE:   1448                 REGION:    EUROPE
CITY:          COPENHAGEN                      NORTH AMERICA
LANGUAGES:     DANISH               PARTNER TYPE:   VALUE ADDED RESELLER
               GERMAN                               SOFTWARE SOLUTIONS AND
               ENGLISH                              TECHNOLOGY PARTNER

| ABOUT | WORK HISTORY | EXPERTISE AND CERTIFICATIONS | CUSTOMER REFERENCES | NEWSLETTERS | SOCIAL MEDIA | PERSONAL INTEREST |

ABOUT
FIRST NAME:   STEFAN

MOBILE:   001 347 83437

DISPLAY CONTACT INFO: ▽

QUICK LINKS

PRODUCTS & SOLUTIONS

BUSINESS ALL-IN-ONE >

BUSINESS ONE >

INDUSTRIES

HIGH TECH >

MARKETING

SUBMIT A MDF REQUEST OR CLAIM >

SUBMIT A CUSTOMER REFEENCE >

SALES

REGISTER LEADS >

GET A QUOTE >

GET COMPETITIVE INFORMATION >

MY PARTNEREDGE

SUBMIT OR UPDATE YOUR BUSINESS PLAN >

{ 1304

TRENDING NOW

CHECK OUT THE FINAL # OLYMPICS BLOG FROM PARTNER @ GAVDI GROUP.

PARTNERS: NEW MSB PACKAGES ARE NOW AVAILABLE IN VIRTUAL AGENCY!

PARTNEREDGE.COM IS NOW LIVE! WHAT ARE YOUR THOUGHTS ON THE NEW SITE?

PRESALES ASSET OF THE WEEK: TRANSFORMING BUSINESS SYSTEMS

INTEGRATED FRAMEWORK FOR SECURED DATA PROVISIONING AND MANAGEMENT

BACKGROUND

Enterprise data may be scattered when accessed by different systems and applications in an enterprise. Such systems and applications may be deployed on different platforms that may result in fragmented infrastructure. An end user may experience latency and inconsistency when such data is consumed via fragmented infrastructure. Fragmented infrastructure may also add overheads of integrating systems and applications that may result in undesirable user experiences, limited personalization of content, inefficient user management and access control rights, inefficient content management techniques, etc. Therefore, providing an infrastructure that facilitates provisioning data that enhances and improves the overall experience of the user when consuming the enterprise data may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 8 is a block diagram illustrating a user interface displaying contextual information associated with business data, according to an embodiment.

FIG. 13 is a block diagram illustrating a user interface displaying contextual information associated with business data, according to an embodiment.

DETAILED DESCRIPTION

Figure 1:
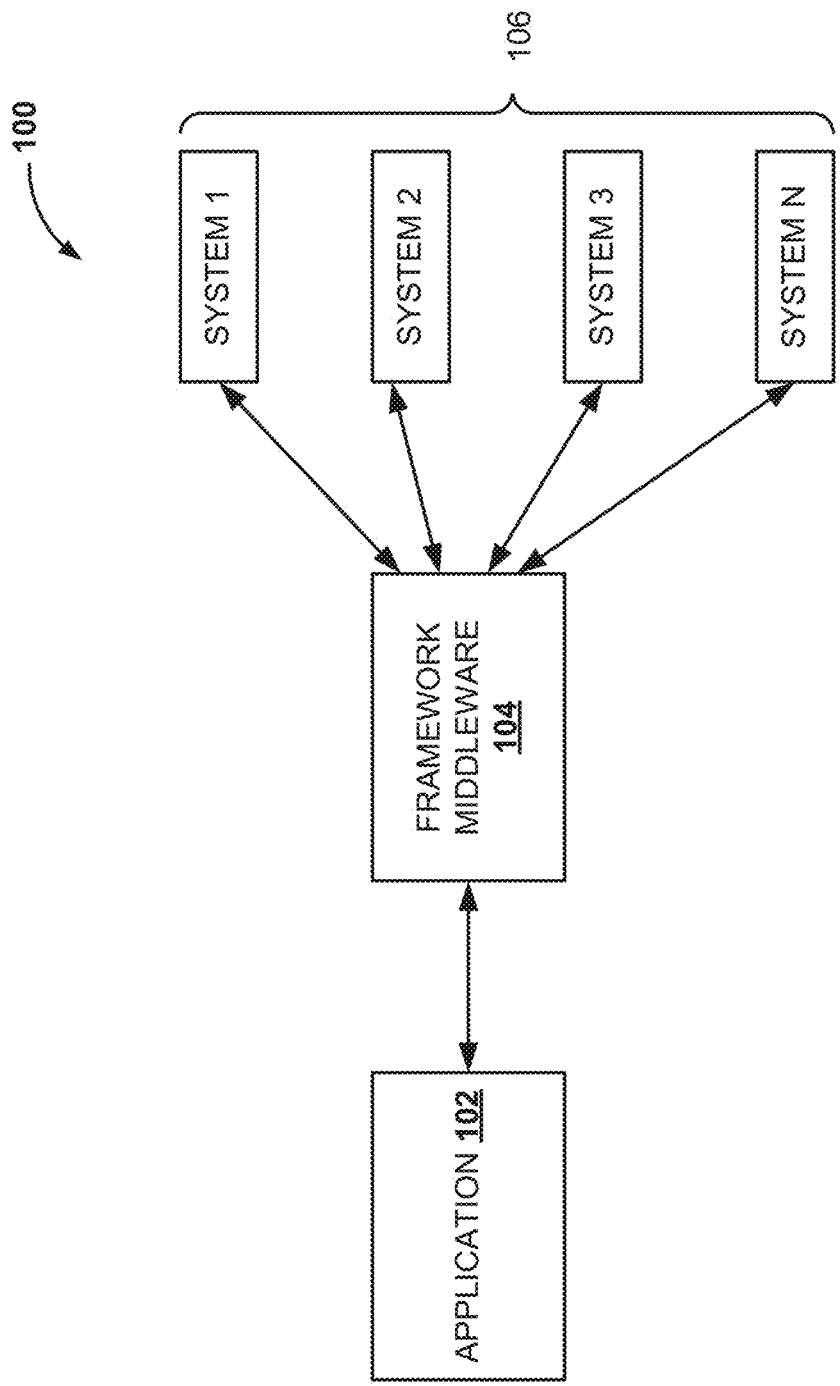
FIG. 1 is a block diagram illustrating environment to provision contextual information associated with business data, according to an embodiment.

Embodiments of techniques related to integrated framework for provisioning data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Advancements in technology have contributed to growth of enterprises and increased volume of business data associated with an enterprise. Such business data may be stored in geographically distributed data repositories (e.g., data stores, databases, etc.). The business data may be accessed and modified by multiple systems and applications that may be deployed on different platforms (e.g., on-premise environment, cloud computing environment, etc.) in the enterprise. In such a scenario, the business data may be altered and may result in generating business data that may be inconsistent. For example, the business data maybe repetitive, redundant and may be stored multiple formats (e.g., data types) thereby adding to the inconsistency. To eliminate such inconsistency, the enterprise may provide a framework that may communicate with the different systems and applications (e.g., business management systems and applications) in the enterprise.

In an embodiment, a framework (also referred to as a framework middleware) may facilitate provisioning the business data by maintaining consistency, security and integrity of the business data. The framework middleware may provide unified architecture and design across different platforms to enable reusability of system and application components (e.g., existing user interface (UI) applications or parts of applications, business data, etc.). Therefore, the framework middleware may optimize the performance of the systems and applications and hence provision a platform for the systems and applications to work in conjunction with each other.

In an embodiment, lime framework middleware may facilitate retrieving and storing business data in systems and applications that may be deployed on premise or in distributed environment (e.g., cloud computing environment). The framework middleware may provide a platform that may work in conjunction with an application (e.g., data provisioning application) and multiple systems (e.g., business management systems, such as Partner Relationship management (PRM), Enterprise Resource Planning (ERP), Customer Relationship Management (CRM), Service Mobile Platform (SMP), Ramp-up Knowledge Transfer (RKT), Learning Solutions (LSO), etc.). In an embodiment, a business management system may include an integration of applications for facilitating and managing business activities in an organization. The application may provision business data that may be personalized and customized based on a preference of an end user. The application may be designed based on a model view controller (MVC) which may provide definitions to distinguish between operations, such as processing control, data models and displaying or rendering the business data on a user interface or a dashboard.

In an embodiment, an application designed based on MVC may be used as an object that may be used to administer the business data. Such an object may respond to information requests from the process control. In an embodiment, personalizing the business data may include determining: contextual information associated with the business data, user preferences, application of localization rules, application of language preferences, etc. Further, the provisioning of personalized business data may be enhanced by customizing the personalized business data using business rules and user interface (UI) components. Such customization may enhance and improve the user experience, when consuming the business data.

In an embodiment, the framework middleware may include integrated frameworks and/or software components (also referred to as a component) executing specific functionalities. The software components in the framework middleware may work in conjunction with each other. In an embodiment, a software component may correspond to set of instructions or program code that may be reused based on definition and implementation. Based on executed operations, the cooperation between the software components may facilitate instantiation of models, user interface engines, customizing contextual information associated with the business data, managing behavior of the GUIs at the design time and runtime, etc.

FIG. 1 is a block diagram illustrating environment 100 to provision contextual information associated with business data, according to an embodiment. In an embodiment, FIG. 1 shows application 102 (e.g., data provisioning application) in communication with framework middleware 104. The framework middleware 104 may be in communication with multiple business management systems 106 (e.g., databases associated with the business management systems that may be deployed in on-premise, cloud computing environments, analytics system and databases (row wise, column wise, etc.)). In an embodiment, application 102 may include an integration of multiple user interface (UI) components, UI engines, business rules, theming rules (e.g., themes for customizing the business data), user session management rules, etc. The UI components and engines may facilitate customizing personalized business data and displaying the customized business data on a user interface (not shown) or a dashboard (not shown) to enhance and improve user experience when consuming the business data.

In an embodiment, framework middleware 104 may include an integration of multiple routines (e.g., sequence of program instructions), operational engines (e.g., data customization and content management engines, user management engine, etc.), data models, frameworks (e.g., data provisioning framework, adapter framework, federation framework, real-time provisioning adapter, etc.), software components (e.g., metadata manager, metadata, etc. etc. The execution of multiple routines, software components, frameworks, etc., in conjunction with each other may facilitate providing specific functions or tasks. The framework middleware 104 may execute tasks such as triggering data models, retrieving business data from the multiple business management systems (e.g., 106) using data services, retrieving the business data from the multiple business management systems (e.g., 106), replicating the business data, transforming business data based on system landscape transformation models, structuring business data based on the data models, managing users (e.g., registration, creating user identity, authorization, authentication, etc.) across the multiple systems, maintaining consistency and integrity of the business data, encrypting the business data, triggering events within or between the multiple systems, etc.

In an embodiment, framework middleware 104 may receive a request from application 102 (e.g., data provisioning application) to establish a connection. Upon processing the request, application 102 may establish the connection with the multiple business management systems 106 via an adapter framework associated with framework middleware 104. A user logged into application 102 may be authenticated by executing routines in framework middleware 104. The framework middleware 104 may retrieve the business data via a real-time provisioning adapter framework associated with framework middleware 104. The framework middleware 104 may execute routines to trigger a system landscape model to transform the retrieved business data. Based on parameters (e.g., user credentials such as user roles, attributes related to information access, etc.), framework middleware 104 may determine contextual information associated with the transformed business data. Upon determining the contextual information, application 102 may instantiate a user interface or a dashboard to render the contextual information associated with the transformed business data. The contextual information displayed on the user interface or dashboard may further be customized based on user preferences to enhance and improve the user experience, when consuming the business data.

Figure 2:
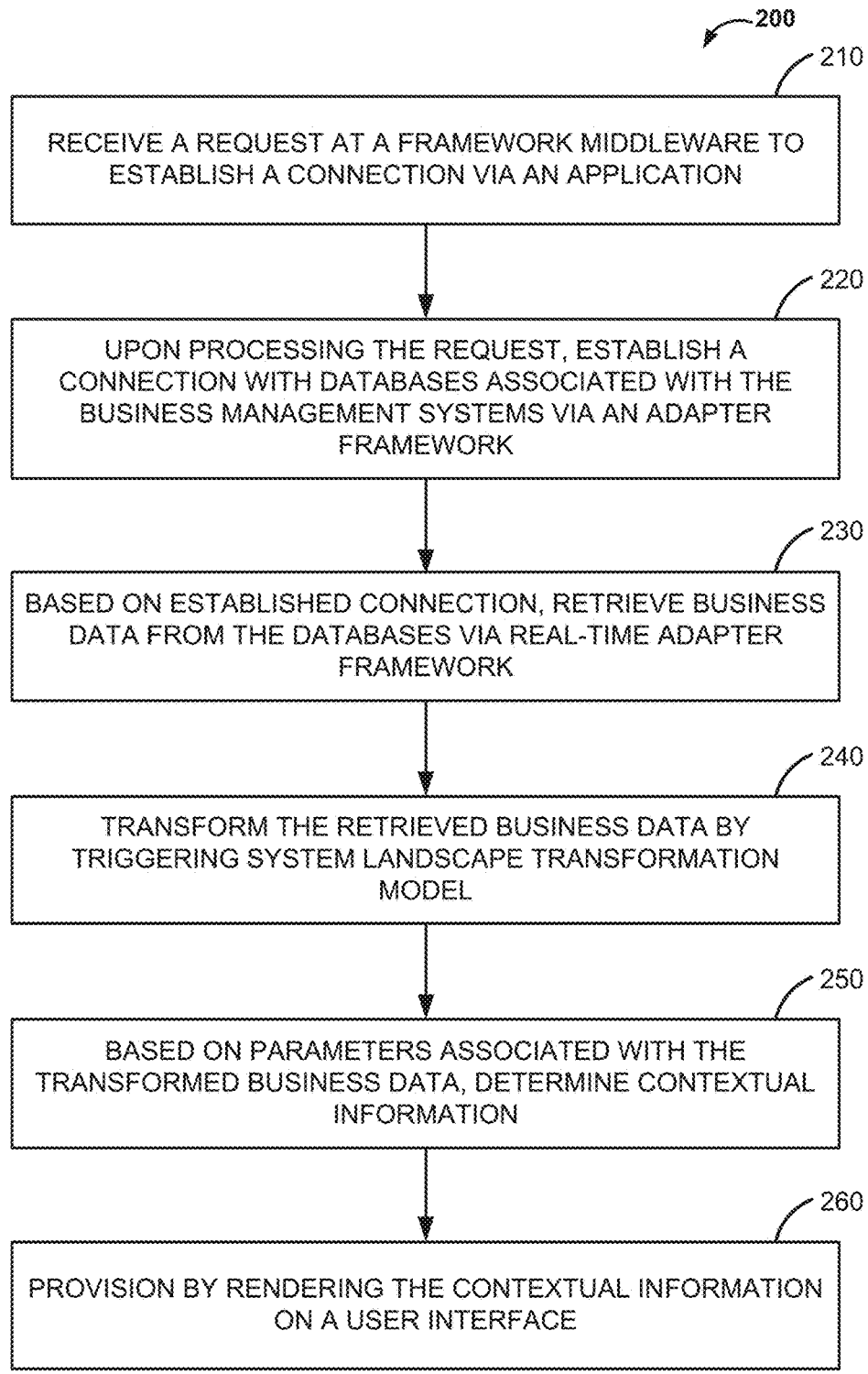
FIG. 2 is a flow diagram illustrating a process to provision contextual information associated with business data, according to an embodiment.

FIG. 2 is a flow diagram illustrating a process 200 to provision contextual information associated with business data, according to an embodiment. In an embodiment, contextual information associated with the business data may be determined and rendered on a user interface. The contextual information displayed on the user interface or the dashboard may be personalized and customized (e.g., by theming, styling content) based on user preferences. In an embodiment, a framework middleware may be in communication with an application and multiple data stores associated with multiple business management systems (e.g., 106). The application may provide a platform (e.g., data provisioning platform) for consuming the business data by a user. Such platform may include an integration of user interfaces or dashboards that may be instantiated by the UI engines to render the business data. The application may be in communication and work in conjunction with the framework middleware. The application may execute functionalities such as access control to multiple related, but independent software systems (e.g., single sign-on implementation (SSO)), session management, filtering of business data based on location (e.g., localization), enhancing graphical appearance of the business data using graphical control elements, window size and shapes, etc.

In an embodiment, the framework middleware receives a request to establish a connection via the application, at 210. The application may be deployed in an on premise computing environment or distributed computing environment (e.g., cloud computing environment). In another embodiment, the application may be customized and deployed to execute as a mobile application on a tablet computer, a mobile device, a multifunction portable electronic device, etc. In an embodiment, upon processing the request, the application establishes a connection with the multiple databases associated with the business management systems via an adapter framework associated with the framework middleware, at 220. The databases may store business data in different formats and multiple data structures (e.g., table, flat files, etc.).

In an embodiment, the business data stored in the multiple data stores may correspond to data and information generated by the business management systems. For example, the business management systems may include CRM, ERP, PRM, SMP, RKT, LSO, etc. The business data from the multiple business management systems may be stored in multiple geographically distributed databases. In an embodiment, based on the established connection, business data is retrieved from the databases via real-time adapter framework associated with the framework middleware, at 230. Upon retrieving the business data via the real-time adapter framework, routines deployed in the framework middleware may be executed. The execution of such routines tray trigger system landscape model to transform the retrieved business data in a user-defined format.

In an embodiment, the business data retrieved from the multiple business databases is transformed by triggering the system landscape transformation model, at 240. The execution of routines in the framework middleware may correspond to execution of system landscape transformation model. Such a transformation modifies the business data to associate with or conform to the data models. For example, business data in one format (e.g., a word processing complaint format, such as .doc, .docx) may be transformed to another format (e.g., based on data models that tray correspond to plain text format; rich text format, etc.). In an embodiment, transforming the business data may include integrating business process model and business data (e.g., executing business rules, identifying entity types (binding of business data and functionality), etc.). The data models may include definitions and format of business data and may provide a unified platform for development of information systems.

In an embodiment, the transformed business data may be structured, and include or be associated with contextual information. The transformed business data may also include identifiers and parameters or determining or identifying contextual information associated with the business data. In an embodiment, the identifiers may facilitate operations, such as determining the contextual information, providing access control to business data and/or the contextual information, localization of the business data, filtering and customization of the business data or the contextual information associated with the business data based on user preferences, etc. Upon user authentication, the contextual information may be rendered on the user interface or the dashboards. The identifiers associated with the contextual information may be matched with the user attributes (e.g., attributes related to user authorization or authentication, user preferences, etc.) to determine providing accessibility to the contextual information or the associated business data.

In an embodiment, based on parameters associated with the transformed business data, the contextual information associated with the business data is determined, at 250. The contextual information associated with the business data may be determined by executing the routines in the framework middleware. The execution of the routines may include matching the user attributes and the identifiers associated with the contextual information associated with the business data. In an embodiment, the user attributes may be related to a designation (e.g., role and responsibilities of a user/employee in an organization), regional and language preferences, preferences related to contextual information associated with the business data, user identity, accessibility and authorization, etc.

In an embodiment, the contextual information associated with the business data is provisioned by rendering the contextual information on a user interface, at 260. The contextual information displayed on the user interface may be personalized or customized based on user preferences and authorization privileges. In an embodiment, the customizing engines in the application may customize the contextual information to enhance and improve visual appearance of the contextual information displayed on the user interface. In an embodiment, the framework middleware may include routines related to content management engines, such as web content management engine, document management engine, dashboard management engine, widget management engine, workflow management engine, etc., that may work in conjunction with each other. The content management engines may be triggered by workflow management routines to execute respective functions.

Figure 3:
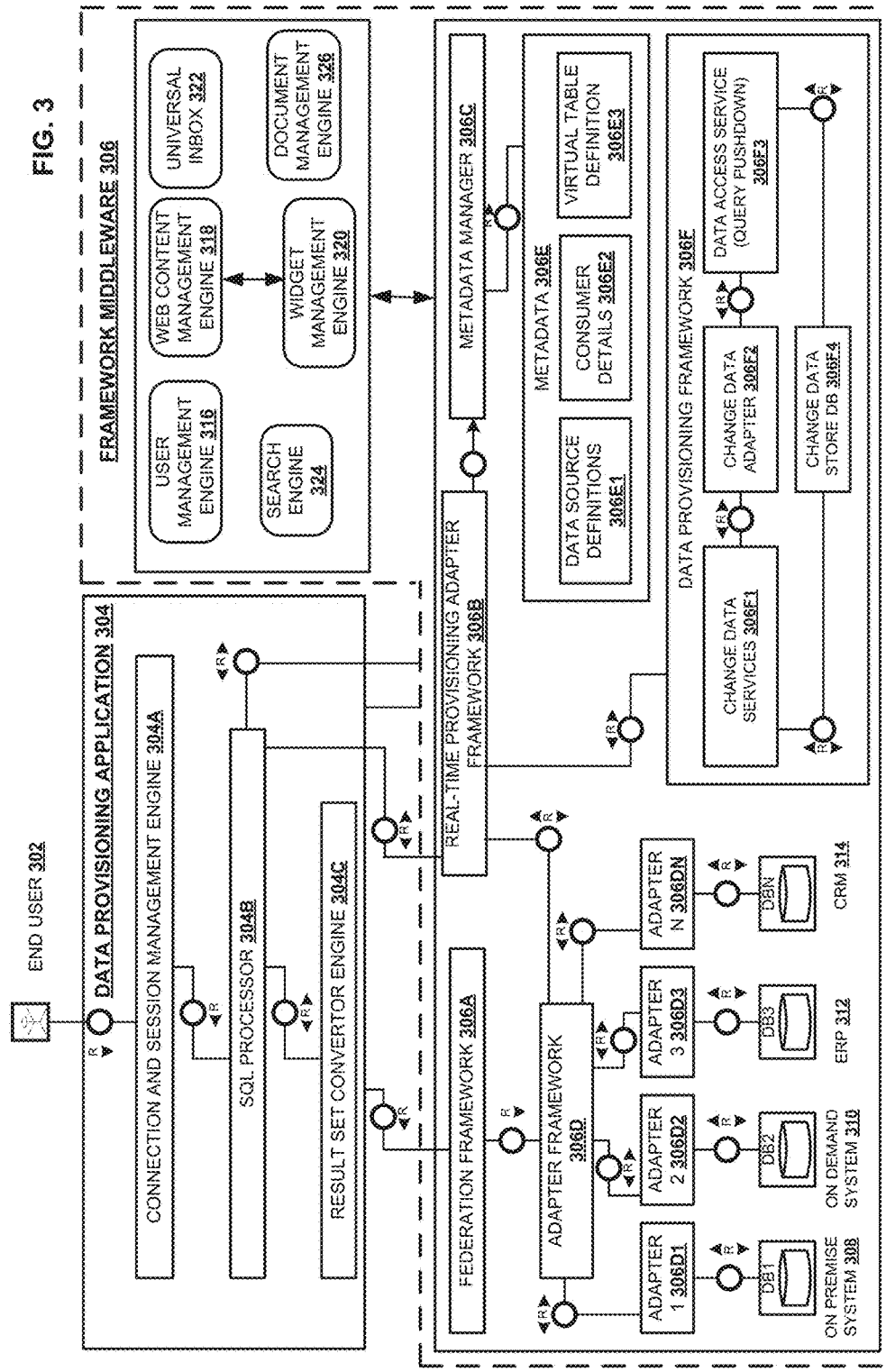
FIG. 3 is a block diagram illustrating a system to provision contextual information associated with business data, according to an embodiment.

FIG. 3 is a block diagram illustrating a system to provision contextual information associated with business data, according to an embodiment. In an embodiment, data provisioning application 304 may be in communication with framework middleware 306 over a network (not shown). The data provisioning application 304 may include an integration of multiple user interface (UI) application components and data fields that may facilitate storing business data from multiple business management systems. The UI application components may be created using a generic data model (e.g., business data including metadata) that may store business data from the multiple business management systems as per user preferences.

In an embodiment, data provisioning application 304 may include an integration of components or engines (e.g., connection and session management engine 304A, SQL Processor 304B, result set convertor engine 304C, etc.) that may work in conjunction with each other. The integrated components or engines may provision contextual information associated with the business data to an end user 302. In an embodiment, data provisioning application 304 may include connection and session management engine 304A to establish and manage connections with framework middleware 306. A sequel (SQL) processor 304B engine may facilitate execution of SQL queries for retrieving business data from the databases (e.g., DB1, DB2, DB3, DBN, etc.). A result set convertor engine 304C may convert or transform the business data into a format (e.g., Java Script Object Notion (JSON), supported by data provisioning application 304.

In an embodiment, framework middleware 306 includes an integration of routines related to: triggering system landscape transformation data models, providing/consuming data services, managing users via user management engine 316, managing content using content management engines, such as web content management engine 318, document management engine 326, widget management engine 320, workflow management engine, universal inbox 322, search engine 324, etc. In an embodiment, the system landscape transformation model may trigger operations (e.g., execute operations such as delete, update, modify, add, etc., on database tables). The system landscape transformation model may include mapping information associated with the business data (e.g., storage information related to the business data).

In an embodiment, web content management engine 318 may include content classes, access control parameters, provisioning for customization and content management including language preference, templates, workflow, web pages, etc. The document management engine 326 may provision for customization and management related to digital documents including access control parameters, meta data, versioning, workflow, retention, etc. In an embodiment, widget management engine 320 may be configured during the design time. The widget management engine 320 may provide customized widgets that may be added to dashboards or user interfaces to enhance and improve the visual appearance of the information displayed. The widget management engine 320 may be configured using network tools during design time and executed during runtime. Additionally the widget management engine 320 may be used to generate views that may be associated with the multiple business management systems. The universal inbox 322 may facilitate as a central inbox for all workflows and action items. The search engine 324 may execute search queries and may enable searching for the business data.

In an embodiment, user management engine 316 may manage user registration, user identities, user authorization (e.g., using SSO) for accessing business data and/or the contextual information associated with the business data. The user management engine 316 may execute operations, such as user registrations, generate and validate user identities (e.g., user roles, profiles and access control to business data), provide user authorization or authentication, etc.

In an embodiment, end user 302 may login into data provisioning application 304 and may interact with data provisioning application 304 to consume the business data (or contextual information associated with the business data). To provision the contextual information to end user 302, data provisioning application 304 may establish a connection with framework middleware 306. The framework middleware 306 may communicate with the multiple remote databases (e.g., DB1, DB2, DB3, DBN, etc.) associated with the multiple business management systems (e.g., 308, 310, 312, 314) via adapter framework (e.g., 306D, 306D1, 306D2, 306D3, 306DN, etc.).

In an embodiment, adapter framework 306D may include an integration of multiple routines and stored procedures. The adapter framework 306D may facilitate provisioning of the contextual information or the business data by executing the routines and stored procedures. The adapter framework 306D may include an integration of application package interfaces (APIs) to facilitate interaction and communication with the remote databases associated with business management systems (e.g., DB1, DB2, DB3, DBN, etc., associated with 308, 310, 312, 314, etc.) respectively via adapter frameworks (e.g., 306D1, 306D2, 306D3, 306DN, etc.). The adapter framework 306D may dynamically create a user certificate with limited validity to access the business data from the databases. The adapter framework 306D may also authenticate the user based on user authentication information (e.g., user name, password, etc.) and database authentication information (e.g., DB user name, DB password, etc.). Upon authentication and connection establishment, adapter framework 306D may access and retrieve the metadata information from the databases. Such metadata information may be associated with the data structures (e.g., tables, flat files, etc.) storing the business data from business management systems (e.g., on-premise system 308, on demand system 310, ERP 312, CRM 314, etc.). The adapter framework 306D may be configured to access business data stored in different formats.

In an embodiment, upon establishing the connection with the databases, data provisioning application 304 may determine, retrieve and locally store the metadata information. For example, such metadata information may correspond to schema name, table name, data fields, etc. When the user attempts to access the business data, stored procedures, SQL queries, etc., may be triggered and the SQL processor 304B in data provisioning application 304 may process such queries and stored procedures. In an embodiment, the queries may be executed or pushed down to the databases via federation framework 306A. In an embodiment, federation framework 306A may execute the queries or stored procedures by data access services. The federation framework 306A may be optimized to connect and access the business data from the databases.

In an embodiment, upon executing the queries and stored procedures, the business data may be retrieved via real-time provisioning adapter framework 306B. In an embodiment, real-time provisioning adapter framework 306B may facilitate accessing the business data in real-time. The changes in the business data may be instantaneously captured and reflected via real-time provisioning adapter framework 306B. In an embodiment, real-time provisioning adapter framework 306B may be configured to determine functional status and availability of the databases (e.g., DB1, DB2, DB3, DBN, etc.). For example, the remote databases (e.g., DB1, DB2, DB3, DBN, etc.) may attain temporarily non-functional status. When such an instance is detected, real-time provisioning adapter framework 306B may facilitate accessing the business data persisted in the persistency layer of the databases (e.g., DB1, DB2, DB3, DBN, etc.). Such persistent business data may be replicated to data provisioning application 304, when end user 302 consumes the business data. In an embodiment, when the remote databases (e.g., DB1, DB2, DB3, DBN, etc.) assume functional status, real-time business data may be replicated to data provisioning application 304 via real-time provisioning adapter framework 306B.

In an embodiment, result set convertor engine 304C may facilitate conversion or transformation the business data into a data model (e.g., JSON document model) supported by data provisioning application 304. The JSON document model may be independent of the underlying schema that may facilitate interaction, analysis, assimilation and provisioning of the business data by data provisioning application 304. In an embodiment, framework middleware 306 may include an integration of a metadata manager 306C component. The metadata manager 306C associated with framework middleware 306 may manage metadata 306E related information. Such metadata 306E information may correspond to business data source definitions 306E1, virtual table definitions 306E3, information related to users (e.g., consumer details 306E2), etc.

In an embodiment, framework middleware 306 may include an integration of data provisioning framework 306F. The data provisioning framework 306F associated with framework middleware 306 may include an integration of software components such as change data services 306F1, change data adapter 306F2, data access service (for pushing down queries) 306F3, change data store DB 306F4, etc. In an embodiment, change data services 306F1 software component may be configured to read database logs. The change data services 306F1 component may forward the data extracted from data definition language (DDL—statements for creating and administering database tables) and data manipulation language (DML—statements for reading and changing data in database tables) to change data adapter 306F2 software component. The change data services 306F1 software component may read the database log and track database specific log changes.

In an embodiment, change data adapter 306F2 software component may read database logs and stream business data to data provisioning framework 306F. The change data adapter 306F2 component may facilitate real-time change data capturing (CDC) in response to a detection of change in the business data in the databases. In an embodiment, data access service 306F3 software component may work in conjunction with change data services 306E1 component to facilitate capturing and replication of the business data in real-time. The data access service 306F3 software component may facilitate pushing down the queries to the respective databases, manage connections with the databases and may track of the status of transactions (e.g., committed, rolled-back, skipped, etc.). The data access service 306F3 software component may facilitate operations such as clustering or grouping smaller transactions into larger transactions, aggregating change messages into minimal set of commands for tables, applying database specific optimization techniques, etc.

In an embodiment, change data store DB 306F4 may facilitate persisting of the business data. For example, change data store DB 306F4 may work in conjunction with change data services 306F1 software component to persist changes in data when consumed by end users or when target table is locked for other operations. In an embodiment, framework middleware 306 may provide a common interface for accessing the business data from the databases. Such an arrangement may optimize consumption of memory by applications that are executing in the multiple business management systems. The applications running on the multiple business management systems may have access to tables and/or attributes and/or rows including the business data. The framework middleware 306 may facilitate storing routines related to local business rules and global business rules for validating the business data from the multiple business management systems.

In an embodiment, when the validation of the business data fails, the user may be notified by displaying an error message on the user interface or the dashboard. The global business rules may be executed to validate the business data, and upon validation the business data between multiple databases may be synchronized. When the validation of business data based on global rules fails, the business data is not synchronized or replicated, but is stored locally in data provisioning application 304. The user may be notified by displaying suitable error message on the user interface or the dashboard.

In an embodiment, framework middleware 306 may include routines to provide authorization to only certain sections (e.g., partially) of business data. For instance, using access control mechanisms, framework middleware 306 may be configured to provide an access to certain sections and/or content in a business document. Such a partial access to the content may be implemented by executing a combination of business rules and access control techniques. In an embodiment, the accessibility to the business data (e.g., text, multimedia, graphical visualizations, etc.) residing in the data fields in data structures (e.g., table, spreadsheet, etc.) may also be controlled. In an embodiment, the business document may be accessed by multiple business management systems over the network and additional business rules may be executed by framework middleware 306 to regulate operations, such as read only, write only, read-write, etc., depending on which business management system accesses the business document.

In an embodiment, framework middleware 306 may include routines that may validate the quality, consistency and integrity of business data retrieved from or replicated to multiple databases (e.g., DB1, DB2, DB3, DBN, etc.). The framework middleware 306 may provide mechanisms for governing and maintain the integrity and consistency of the business data, when the business data is replicated to multiple databases (e.g., DB1, DB2, DB3, DBN, etc.). For example, when the business data is stored in a business object, which may be accessed and modified by accessed by multiple business management systems, the and consistency of the business data in the business object may need to be validated before replicating it to the other business management systems. In such a scenario, executing business rules in framework middleware 306 may validate the integrity and consistency of the business data in the business object. The replication of the business object may be logged, tracked and stored in tables (e.g., tracking tables) in the database.

In an embodiment, business objects may encapsulate a function and the business data and may be linked with or dependent on other business objects, in such an arrangement, framework middleware 306 may execute routines for intelligent replication of the business objects (e.g., intelligent replication of business objects or business data includes executing routines in framework middleware 306 that work in conjunction with remote function calls (RFCs)). For example, let a business object "OPPORTUNITY" be linked with business objects, such as "EMPLOYEE", "BUSINESS PARTNER", "PARTNER FUNCTION," etc. When the business object "OPPORTUNITY" is to be distributed or shared (e.g., replicated) between multiple business management systems, the execution of routines in the framework middleware 306 may determine that the business object "OPPORTUNITY" is linked with other business objects, such as "EMPLOYEE". "BUSINESS PARTNER", "PARTNER FUNCTION," etc., and may replicate the other business objects (e.g., "EMPLOYEE", "BUSINESS PARTNER", "PARTNER FUNCTION," etc.), when the business object "OPPORTUNITY" is replicated.

In an embodiment, framework middleware 306 may include routines to check for dependencies between the attributes of the same business object. For example, framework middleware 306 may include routines that determine dependency between 'COUNTRY' and 'STATE' data fields within the same business object. In another embodiment, the dependent data fields (e.g., 'COUNTRY' and 'STATE') may reside in different business objects. The execution of such routines in framework middleware 306 may determine dependencies between the business objects and alerts the user when missing dependent business objects are detected. In an embodiment, framework middleware 306 may be configured to replicate the business data to multiple business management systems (e.g., 308, 310, 312, 314, etc.) on periodic basis. For example, such periodic time intervals may include immediately, hourly, daily, weekly, monthly, etc.

In an embodiment, when the business data or the business objects including the business data are modified (e.g., updated, deleted, added, etc.) in framework middleware 306, the modifications may be replicated to other business management systems (e.g., 308, 310, 312, 314, etc.). The framework middleware 306 may execute business rules to keep a track of such data modifications. The business data between the multiple business management systems may be replicated at periodic intervals of time (e.g., immediately, hourly, daily, weekly, etc.). Such periodic updates avoid situations that may generate inconsistent business data due to network latencies, business data packet loss, etc. The business data may be replicated between multiple business management systems (e.g., 308, 310, 312, 314, etc.) based on the business requirements. In an embodiment, framework middleware 306 may include routines to determine duplication of the business data, when the business data is replicated. When duplicate business data is detected the end user may be notified of such duplication.

In an embodiment, framework middleware 306 may include routines that trigger specific events for specific values of the business data. The triggering of the events may be ordered and may be executed either in the same business management system or different business management systems (e.g., 308, 310, 312, 314, etc.). The framework middleware 306 may provide functionalities, such as user group classification, user identification based on roles, responsibilities and attributes associated with the user identity, user authorization and authentication, etc. The framework middleware 306 may include routines to monitor user activities and generate alerts based on the user behavioral patterns.

In an embodiment, framework middleware 306 provides a holistic and integrated platform for the real-time analysis, aggregation and visualization of high volumes, velocities and diversity of the business data. The framework middleware 306 may include routines categorized as "sentiment intelligence" that may determine and analyze comments, suggestions and opinions posted by end users; deliver personalized engaging experiences that may be used to support and take more responsive business decisions. The framework middleware 306 may perform stream analysis that may monitor the incoming events in real-time, detect error patterns, aggregate, analyze and respond to events, errors, etc., by triggering certain events, workflows, etc. The framework middleware 306 may execute routines to communicate with the multiple business management systems (e.g., 308, 310, 312, 314, etc.) and track for updates in the business data. In an embodiment the multiple business management systems (e.g., 308, 310, 312, 314, etc.) may communicate with each other via framework middleware 306. The multiple business management systems may be authenticated using digital and security certificates.

In an embodiment, framework middleware 306 may include routines to encrypt the business data retrieved from multiple business management systems (e.g., 308, 310, 312, 314, etc.). For example, the business data may be encrypted by executing a sequential data encrypting algorithm. The sequential data encrypting algorithm may encrypt the business data using multiple keys (e.g., a first key, a second key, etc.). In an embodiment, the business data may be partitioned based on user preferences or using standard business data sizes (e.g., bits, bytes, words, etc.), and the sequential data encrypting algorithm may be executed to encrypt the partitioned business data.

Figure 4:
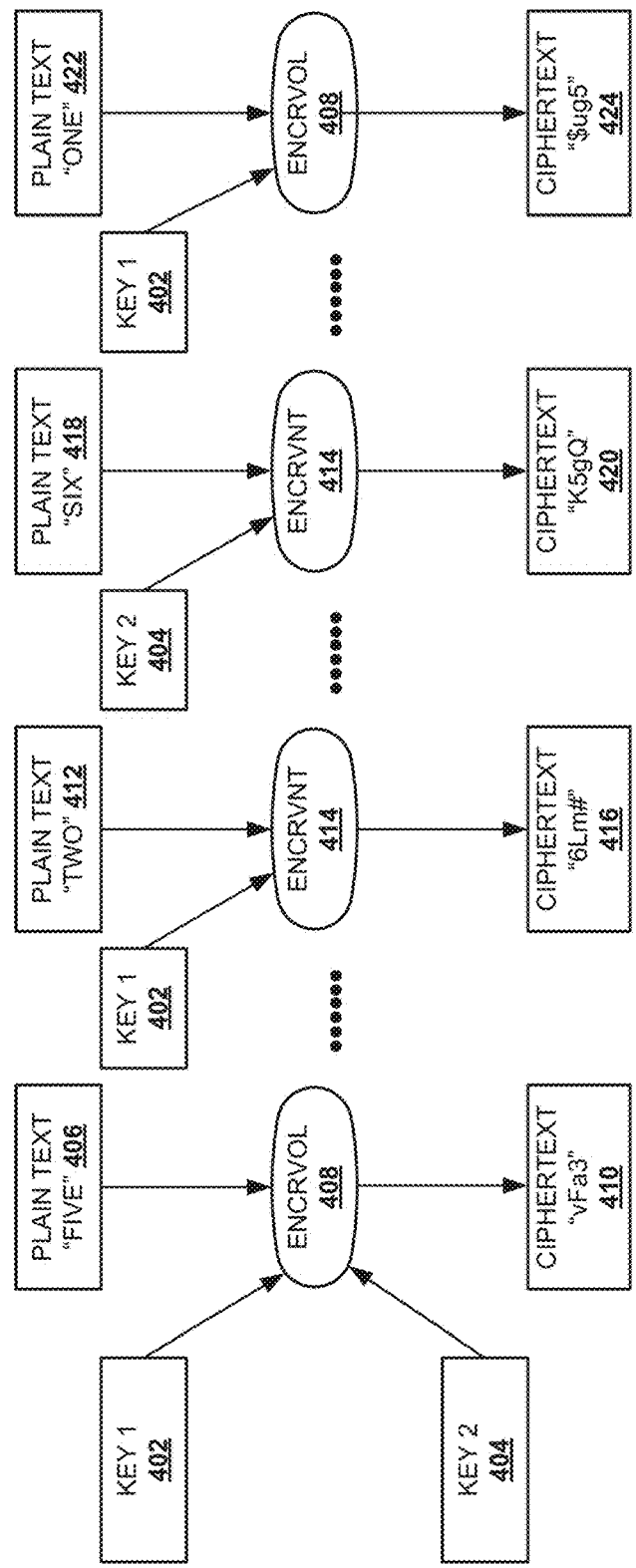
FIG. 4 is a block diagram illustrating a sequential data encrypting algorithm to encrypt business data, according to an embodiment.

FIG. 4 is a block diagram illustrating a sequential data encrypting algorithm to encrypt business data, according to an embodiment. In an embodiment, the execution of sequential data encryption algorithm to encrypt the business data may include: a first step of initialization that includes providing input of multiple keys (e.g., the first key 402 and the second key 404) and the first word 406 (e.g., business data) to be encrypted, and initialize a word count to '1'. The first word "FIVE" 406 may be encrypted "ENCRVOL" 408 to get an encrypted word (e.g., CIPHERTEXT) "vFa3" 410. Upon encrypting the word in the first step, a second step may include encrypting a second word 412 (e.g., business data) using the output of the first step (e.g. word encrypted using the first key 402 and the second key 404). For instance, the second word "TWO" 412 may be encrypted (e.g., "ENCRVNT" 414) by using a combination of the output of the first step ("vFa3") and the first key 402 to get an encrypted second word (e.g., CIPHERTEXT) "6Lm#" 416. Upon encrypting the second word 412, increment the word count by '1'. A third word "SIX" 418 may be encrypted (e.g., "ENCRVNT" 414) by using a combination of output of the second step (e.g., "6Lm#") and the second key 404 and incrementing the word count by '1'. The encrypted third word may be represented by "K5gQ" 420.

In an embodiment, the business data may be encrypted by executing the above steps until the last word is reached. The encryption may continue until the word count reaches a desired number (e.g., word count='100'). When the value of word count reaches '100', the words business logic for encrypting (e.g., "ENCRVOL" 408) the subsequent words (e.g., "ONE" 422) may include using a combination of the first key 402 and the encrypted word (e.g., "K5gQ" 420) from the previous iteration for encrypting the subsequent word to generated encrypted word "$ug5" 424 and so on.

In an embodiment, advantages of sequential encryption may include: an elimination of need for a random initialization vector for encrypting the business data, need for specific data sizes (e.g., bits, bytes, words, etc.) of business data, etc. Sequential encryption mechanism for encrypting the business data (e.g., as described above) provides robust data security and efficient data management and handling mechanisms, when the business data size varies. Based on the nature and property of business data, the user may be provided with an adaptability to customize or define the size of business data. Such adaptability may provide the user to partially encrypt blocks of business data.

Figure 5:
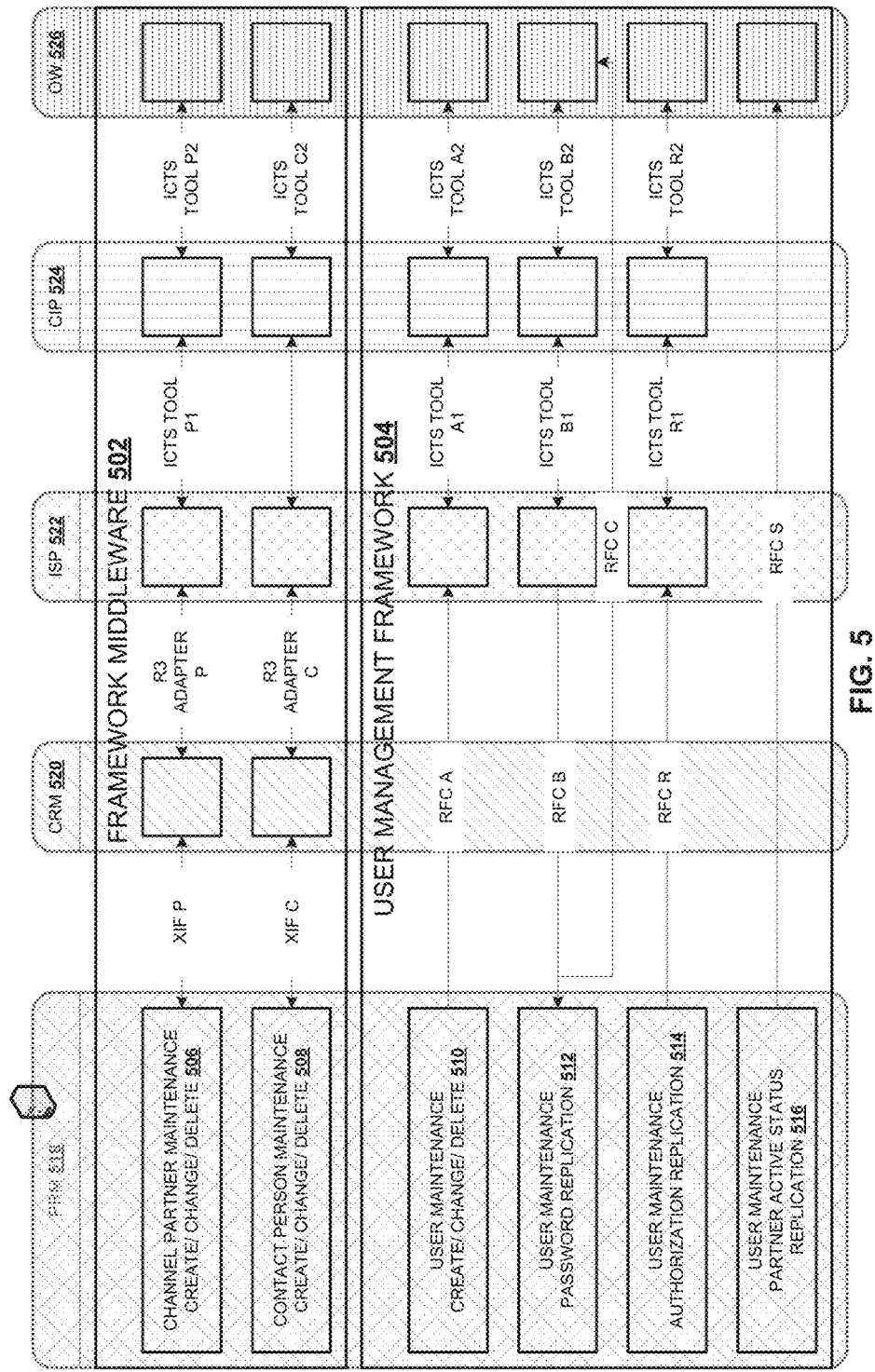
FIG. 5 is a block diagram illustrating an integration of user management framework and framework middleware, according to an embodiment.

FIG. 5 is a block diagram illustrating an integration of user management framework and framework middleware, according to an embodiment. FIG. 5 shows an integration of user management framework 504, and framework middleware 502 to manage user between multiple business management systems 518, 520, 522, 524 and 526. In an embodiment, a user may be registered via user management engine (e.g., 316 in FIG. 3) may be authenticated or authorized by executing routines in framework middleware 502. The routines may include instructions that may be packaged (e.g., software package of meta packages, classes, etc.) and stored in a hierarchy (e.g., packages may be bundled and may include instructions to execute operations related to UI components, database tables, message classes, shared memory classes, toolbox classes, data dictionary objects, online text repositories, authorization objects, reports, enterprise services, etc.). The packages may be stored in different layers in framework middleware 502 or in user management framework 504. In an embodiment, the software packages may be stored in groups (e.g., UI components may be bundled and stored in a business object layer (BOL); Generic Interaction Layer (GENIL) components may be stored as one package; proxy objects may be stored in one group; common and generic functions may be packaged and stored as one group; etc.).

For example, framework middleware 502 may include modules 506 and 508 to manage information related to channel partner and associated contacts (e.g., CHANNEL PARTNER MAINTENANCE 506 and CONTACT PERSON MAINTENANCE 508). The information related to channel partner and associated contacts may be modified (e.g., Create, Change, Delete, etc.) through user interface provided by the application. The information related to channel partner and associated contacts may be managed by executing routines in 506 and 508 in framework middleware 502. In an embodiment, user management framework 504 may include modules 510, 512, 514 and 516. The user management framework 504 may include creating and maintaining users (e.g., USER MAINTENANCE 510); user password replication (e.g., USER MAINTENANCE PASSWORD REPLICATION 512); user authorization replication (e.g., USER MAINTENANCE AUTHORIZATION REPLICATION 514); and partner status replication (e.g., USER MAINTENANCE PARTNER ACTIVE STATUS REPLICATION 516).

In an embodiment, when the user attempts to access business data via the user interface or the dashboard in the application, user management engine in framework middleware may be triggered to execute user authorization and authentication (e.g., user validation) routines. Such user validations may be executed in framework middleware, while the application is being executed in a front end. As explained previously, such validations may be executed by matching the identifiers associated with the contextual information associated with the business data or the identifiers associated with the business data with the user attributes. Upon successful validation, the business data and/or the contextual information may be displayed on the user interface to the end user.

In an embodiment, the information associated with the users (510-516) may be replicated and managed across multiple business management systems (e.g., 518, 520, 522, 524 and 526). The users may be authenticated or authorized by using security certificates. The user may be assigned an identity and every request for accessing or modifying business data may be authenticated by an identity provide in framework middleware. The identity provider may be configured to establish trusted communication between the user and multiple business management systems (e.g., 518, 520, 522, 524 and 526). The user authorization may also include attributes, such as user profiles, organizational roles, etc., that may be used to provide access to the business data.

Figure 6:
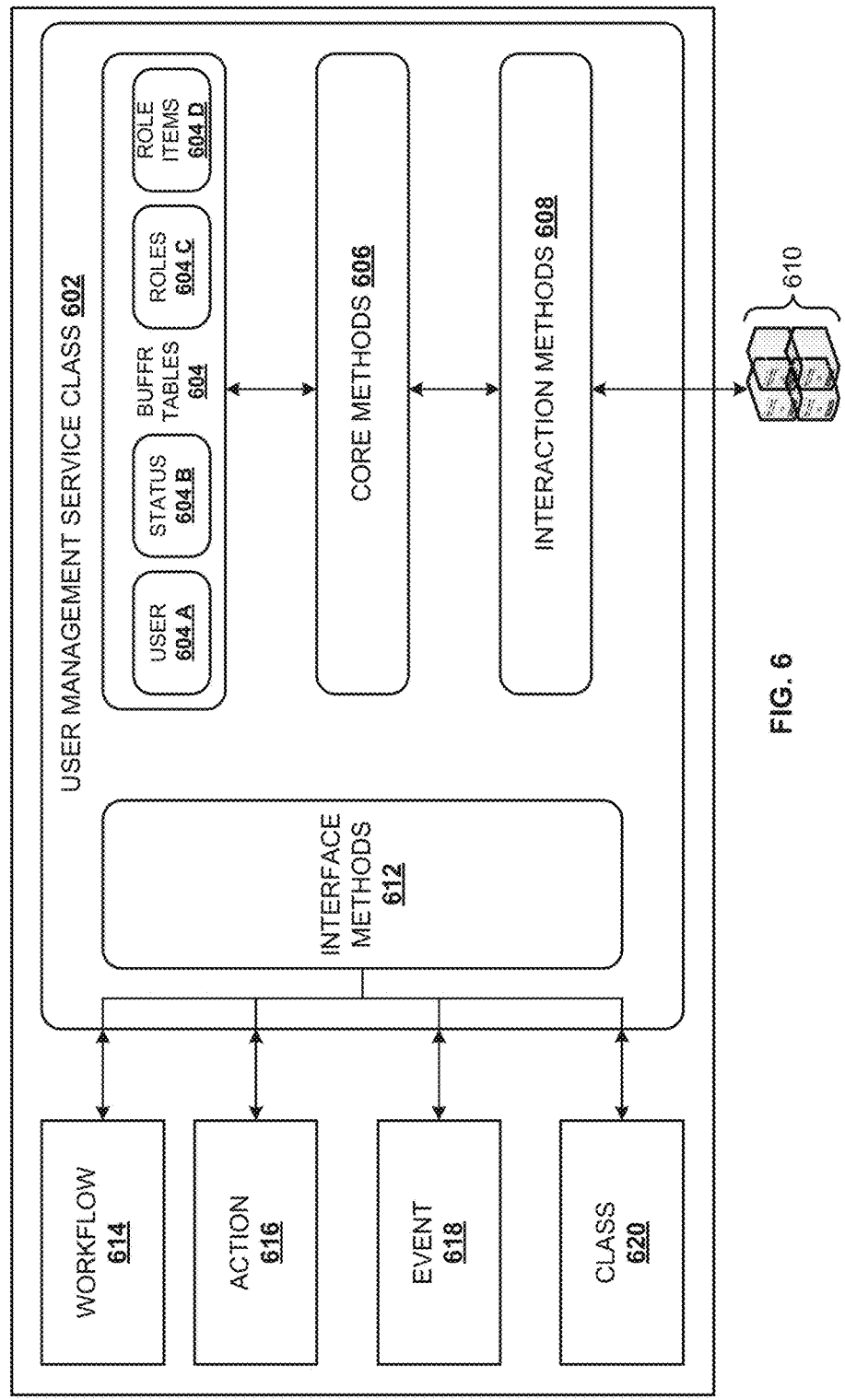
FIG. 6 is a block diagram illustrating a user management service class, according to an embodiment.

FIG. 6 is a block diagram illustrating a user management service class, according to an embodiment. FIG. 6 shows user management service class 602 (e.g., user management framework (e.g., 504 of FIG. 5) implemented as a service class) that may coordinate and manage all tasks and functionalities related to user management. In an embodiment, user management service class 602 may include buffer tables 604 (e.g., that store attributes and business data related to user 604 A, status 604 B, roles 604 C, role items 604 D, etc. core methods 606, interaction methods 608, interface methods 612, etc., (e.g., all the above methods may be executed as routines in framework middleware). The interaction methods 608 may communicate with external business management systems 610 and core methods 606 may include business logic related to business data management. The interface methods 612 may be called or executed or invoked by internal workflow 614, action 616, event 618, or class 620 (e.g., other classes/methods). In an embodiment, user management service class 602 may also be used to create new users and assign user identities. The user management service class 602 may be configured to grant access to content at different levels such as at document level, version level, etc.

Figure 7:
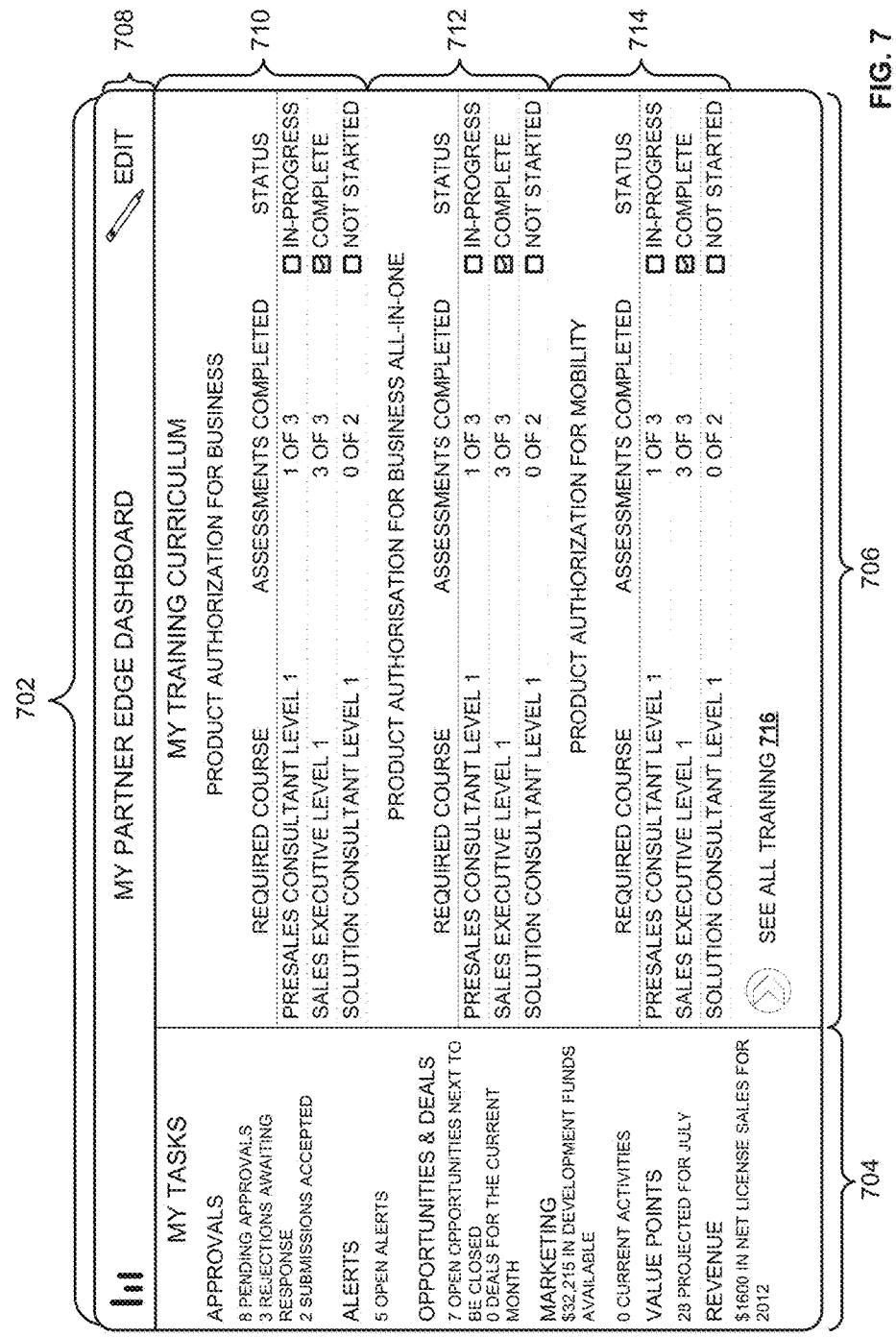
FIG. 7 is a block diagram showing a dashboard displaying contextual information associated with business data, according to an embodiment.

FIG. 7 is a block diagram showing a dashboard displaying contextual information associated with business data, according to an embodiment. In an embodiment, a data provisioning application may instantiate a user interface or dashboard 702 to display the contextual information associated with business data. FIG. 7 shows dashboard 702 displaying contextual information (e.g., 710, 712 and 714; MY TRAINING CURRICULUM) associated with business data. The dashboard 702 includes status bar 708 rendering information related to a partner (e.g., MY PARTNER EDGE DASHBOARD). The information displayed on dashboard 702 may be modified or edited (e.g., by clicking on EDIT in 708). The dashboard 702 displays the contextual information (e.g., 710, 712 and 714) associated with the business data may include information that may be categorized (e.g., MY TASKS 704; MY TRAINING CURRICULUM 706). The contextual information (e.g., 710, 712 and 714) associated with the business data may be retrieved from multiple business management systems and displayed on dashboard 702. The training information associated with the other trainings may be accessed by clicking on 716.

FIG. 8 is a block diagram illustrating a user interface displaying contextual information associated with business data, according to an embodiment. FIG. 8 shows user interface 802 displaying contextual information (e.g., "PARTNER" information) associated with the business data. Status bar 804 on user interface 802 includes information associated with a user (e.g., WELCOME STEFAN), who is logged into the application; a UI element to navigate to favorite content (e.g., MY FAVORITES), a UI element to change language (e.g., ENGLISH); UI element to navigate to technical support (e.g., SUPPORT) and UI element to log off from the application (e.g., LOGOUT). The information associated with the partner may be searched by entering search query in 806. The partner information may be modified by clicking on "PROFILE & SETTINGS" 818. A user may click on the UI elements (e.g., TABS) 808, 810, 812, 814 and 816 and may navigate to the respective user interface to access the information therein. User interface 802 displays "PARTNER INFORMATION" and "COMPANY INFORMATION" as shown by 820. Other details related to the partner (e.g., STEFAN FITCH) may be accessed via the UI elements shown by 822.

Figure 9:
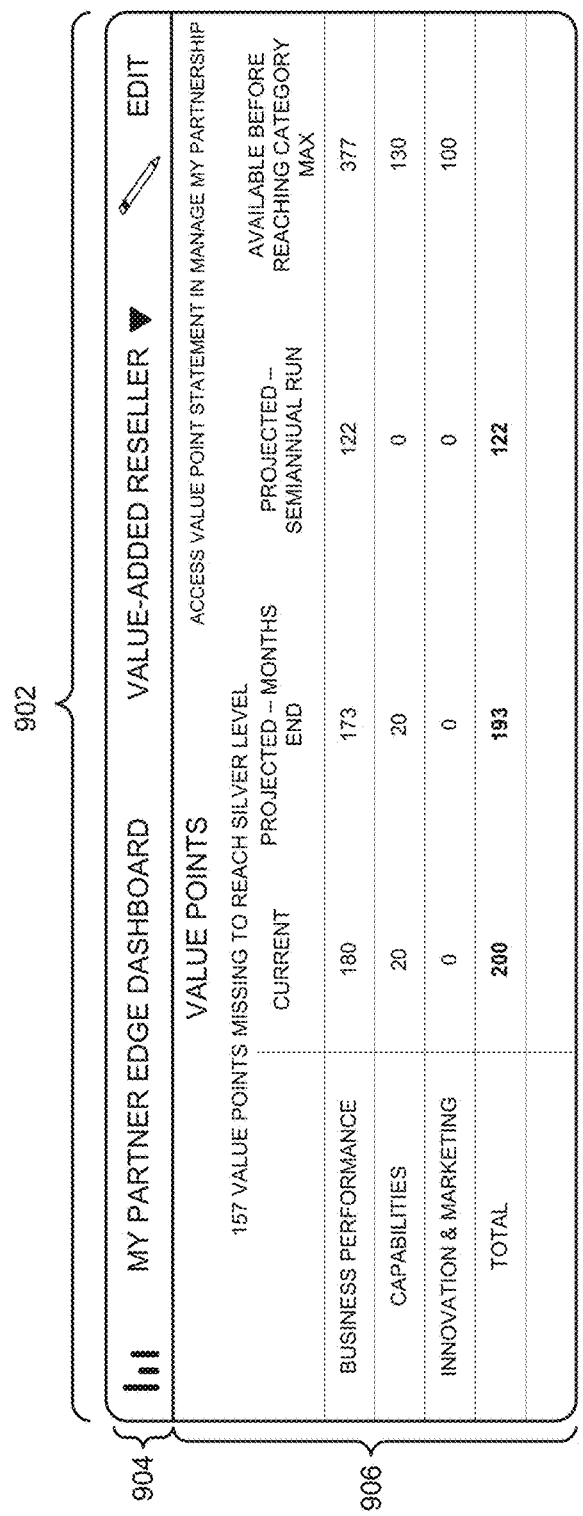
FIG. 9 is a block diagram illustrating a dashboard displaying contextual information associated with business data, according to an embodiment.

FIG. 9 is a block diagram illustrating a dashboard displaying contextual information associated with business data, according to an embodiment. Dashboard 902 shows status bar 904 that includes information related to partner (e.g., MY PARTNER EDGE DASHBOARD), status qualifier associated with the partner (e.g., VALUE-ADDED RESELLER) and UI element to modify or edit (e.g., EDIT) information associated with the partner. Dashboard 902 shows contextual information 906 that includes information associated with the "VALUE POINTS" and associated statistical business data.

Figure 10:
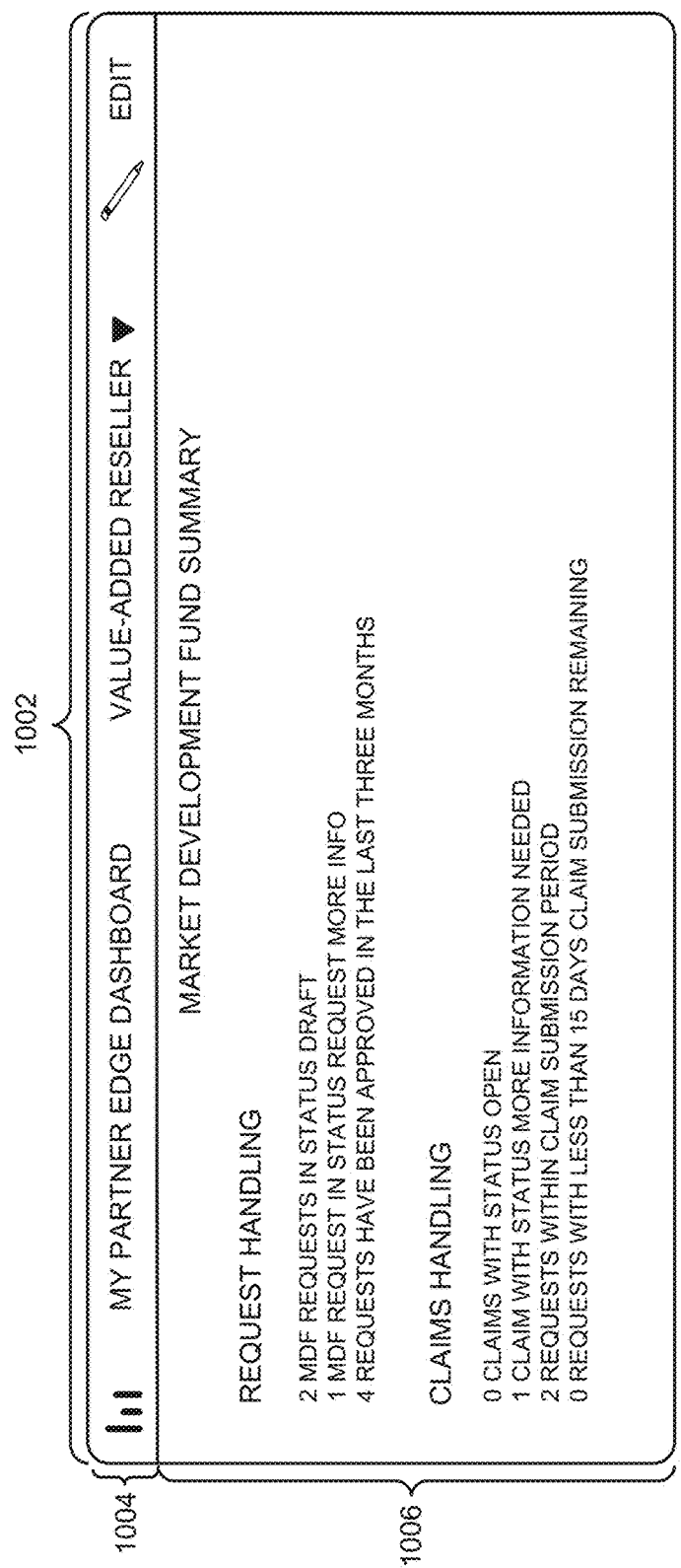
FIG. 10 is a block diagram illustrating a dashboard displaying contextual information associated with business data, according to an embodiment.

FIG. 10 is a block diagram illustrating a dashboard displaying contextual information associated with business data, according to an embodiment. Dashboard 1002 shows status bar 1004 that includes information related to partner (e.g., MY PARTNER EDGE DASHBOARD), status qualifier associated with the partner (e.g., VALUE-ADDED RESELLER) and UI element to modify or edit (e.g., EDIT) information associated with the partner. Dashboard 1002 shows contextual information 1006 that includes information associated with the "MARKET DEVELOPMENT FUND SUMMARY" including "REQUEST HANDLING" and "CLAIMS HANDLING" information.

Figure 11:
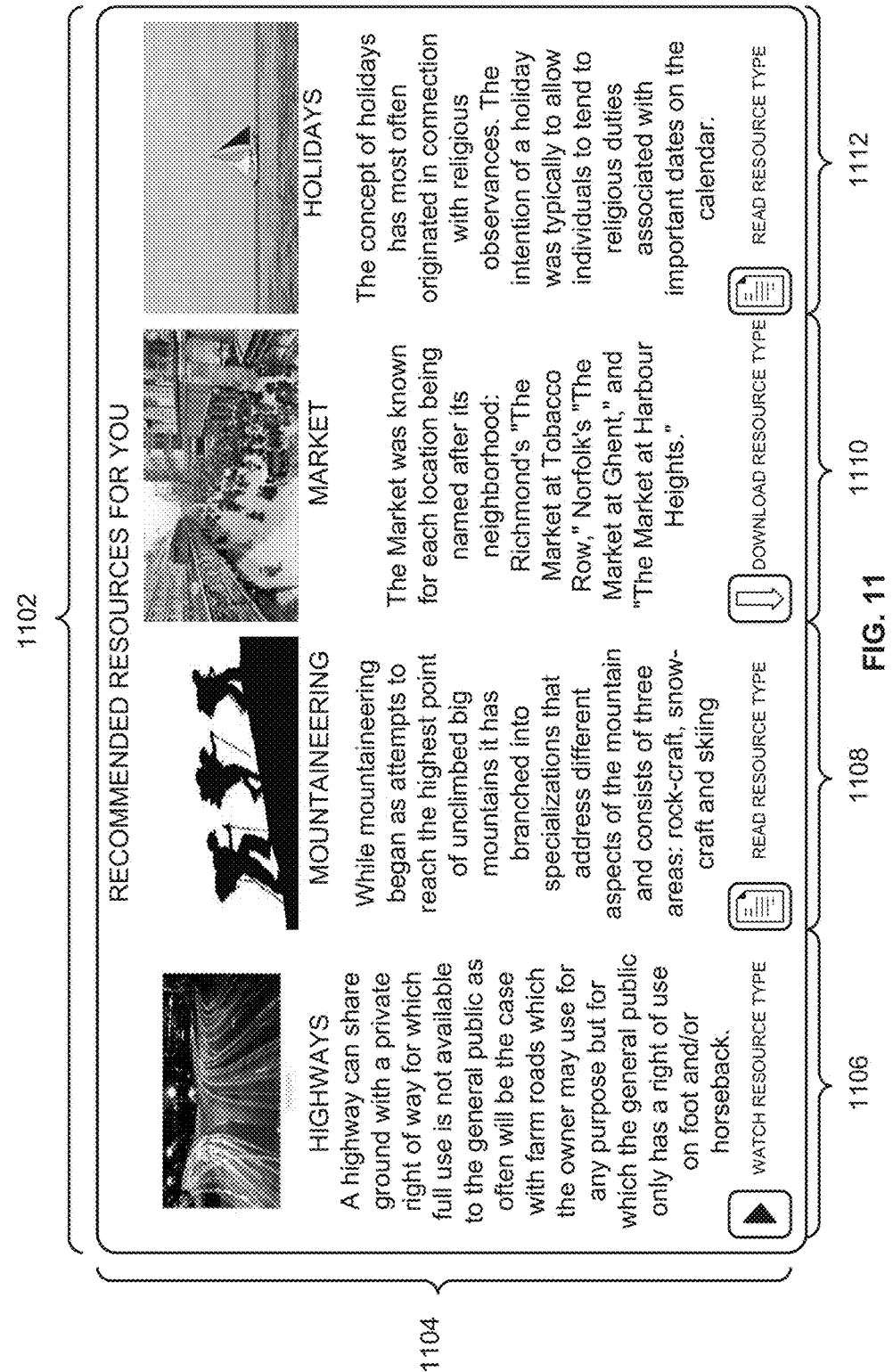
FIG. 11 is a block diagram illustrating a user interface displaying contextual information associated with business data, according to an embodiment.

FIG. 11 is a block diagram illustrating a user interface displaying contextual information associated with business data, according to an embodiment. FIG. 11 shows user interface 1102 displaying contextual information 1104 associated with the business data. The contextual information 1104 may be arranged in columns (e.g., 1106, 1108, 1110 and 1112) and displayed on user interface 1102. User interface 1102 shows contextual information 1104 (e.g., "RECOMMENDED RESOURCES FOR YOU") including multimedia content (e.g., pictures, text, video, etc.). The contextual information arranged in columns (e.g., 1106, 1108, 1110 and 1112) may be customized based on user preferences (as explained previously).

Figure 12:
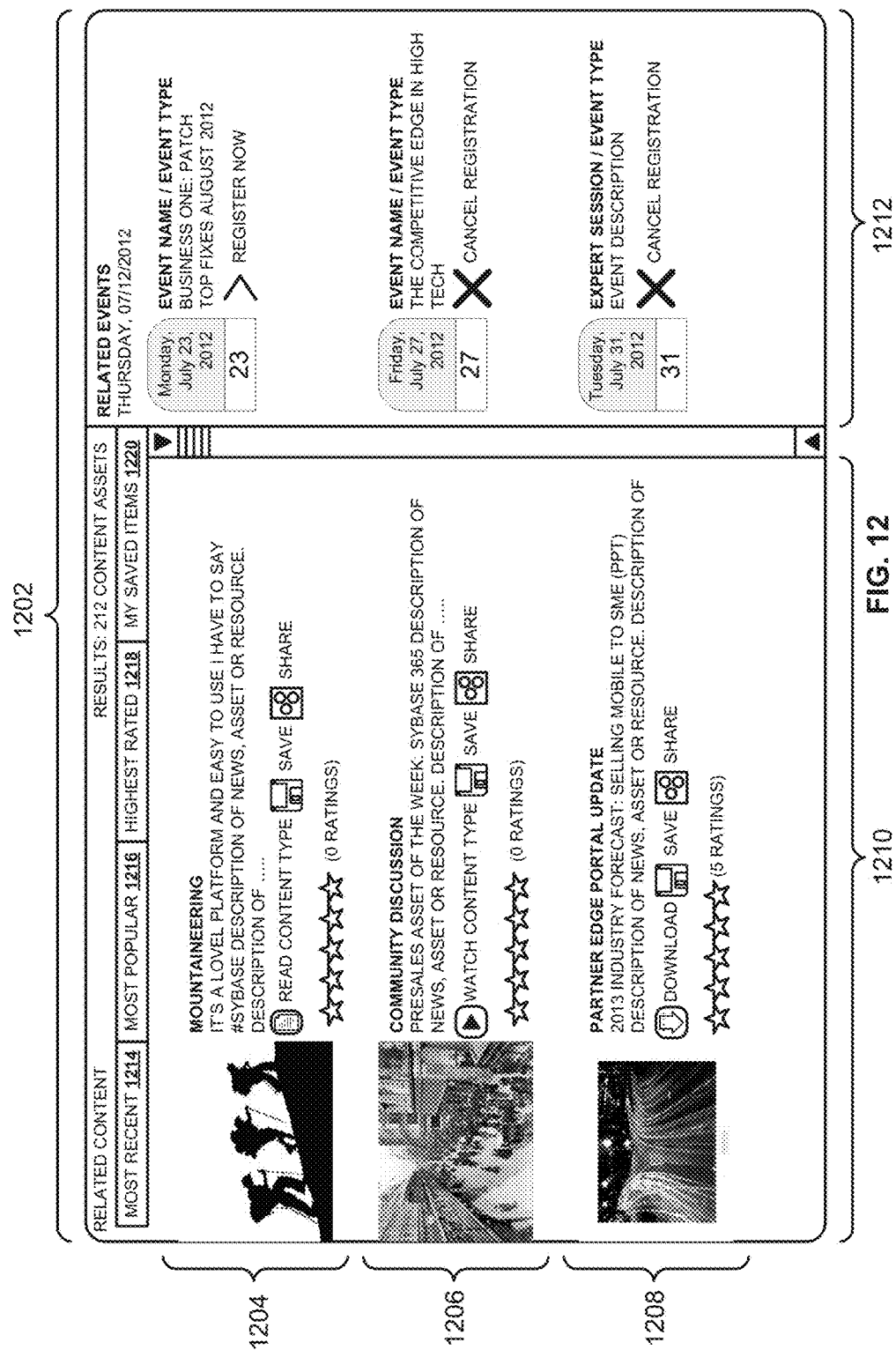
FIG. 12 is a block diagram illustrating a user interface displaying contextual information associated with business data, according to an embodiment.

FIG. 12 is a block diagram illustrating a user interface displaying contextual information associated with business data, according to an embodiment. FIG. 12 shows user interface 1202 displaying contextual information (e.g., 1204, 1206 and 1208 that may categorized and accessed from tabs "most recent" 1214, "most popular" 1216, "highest rated" 1218, "my saved items" 1220, etc.) associated with the business data. User interface 1202 shows contextual information 1210 and related events 1212. The contextual information including the related events 1212 may provide a facility to register and/or cancel registration for the event. A user has an option to read content (e.g., 1204), watch content (e.g., 1206, when content is multimedia type) or download content (e.g., 1208), etc. The contextual information (e.g., 1204, 1206 and 1208) may be saved or shared by clicking on the respective icon (e.g., SAVE, SHARE in 1204, 1206 and 1208).

FIG. 13 is a block diagram illustrating a user interface displaying contextual information associated with business data, according to an embodiment. FIG. 13 shows user interface 1302 contextual information (e.g., 1304 and 1306) associated with business data. The contextual information 1304 shows "QUICK LINKS" that may be used to navigate to the respective content (e.g., dashboards or user interfaces displaying the respective content). The contextual information 1306 includes "TRENDING NOW" that may display the latest and or popular updates related to events, launch of products, etc.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 14:
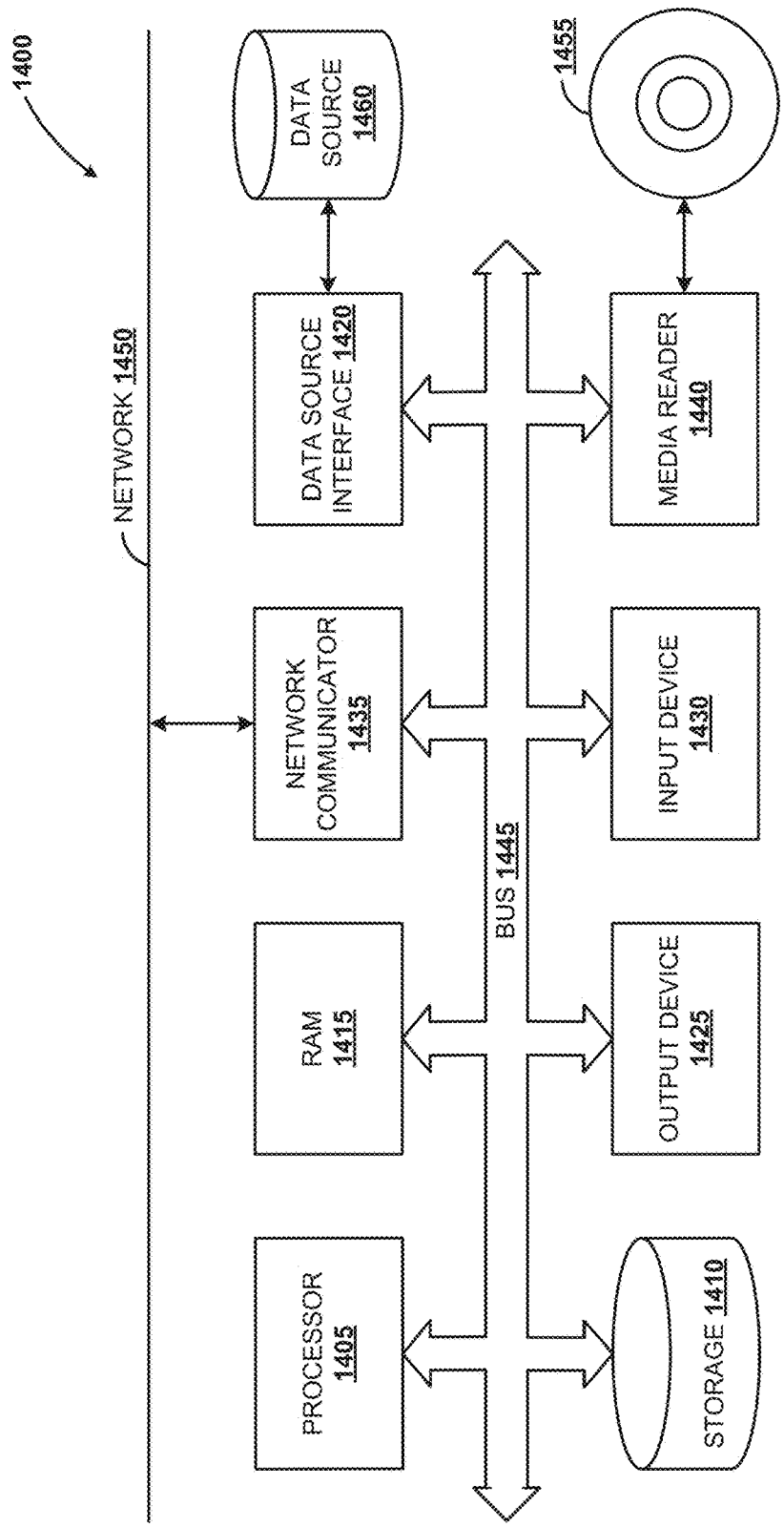
FIG. 14 is a block diagram of a computer system, according to an embodiment.

FIG. 14 is a block diagram of an exemplary computer system 1400, according to an embodiment. Computer system 1400 includes processor 1405 that executes software instructions or code stored on computer readable storage medium 1455 to perform the above-illustrated methods. Processor 1405 can include a plurality of cores. Computer system 1400 includes media reader 1440 to read the instructions from computer readable storage medium 1455 and store the instructions in storage 1410 or in random access memory (RAM) 1415. Storage 1410 provides a large space for keeping static data where at least some instructions could be stored for later execution. According to some embodiments, such as some in-memory computing system embodiments, RAM 1415 can have sufficient storage capacity to store much of the data required for processing in RAM 1415 instead of in storage 1410. In some embodiments, all of the data required for processing may be stored in RAM 1415. The stored instructions may be further compiled to generate other representations of the instructions and dynamically stored in RAM 1415. Processor 1405 reads instructions from RAM 1415 and performs actions as instructed. According to one embodiment, computer system 1400 further includes output device 1425 (e.g., a display) to provide at least some of the results of the execution as output including, but not limited to, visual information to users and input device 1430 to provide a user or another device with means for entering data and/or otherwise interact with computer system 1400. Each of these output devices 1425 and input devices 1430 could be joined by one or more additional peripherals to further expand the capabilities of computer system 1400. Network communicator 1435 may be provided to connect computer system 1400 to network 1450 and in turn to other devices connected to network 1450 including other clients, servers, data stores, and interfaces, for instance. The modules of computer system 1400 are interconnected via bus 1445. Computer system 1400 includes a data source interface 1420 to access data source 1460. Data source 1460 can be accessed via one or more abstraction layers implemented in hardware or software. For example, data source 1460 may be accessed by network 1450. In some embodiments data source 1460 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A system to provision contextual information associated with business data, comprising:
    a processor;
    one or more memory devices communicatively coupled with the processor and storing instructions related to:
        receiving a request to establish a connection at a framework middleware via an application;
        upon processing the request, the application establishing a connection with a plurality of databases associated with a plurality of business management systems via an adapter framework associated with the framework middleware;
        based on the established connection, retrieving business data from the plurality of databases via a real-time provisioning adapter framework associated with the framework middleware;
        based on an execution of a plurality of routines in the framework middleware, triggering a system landscape transformation model to transform the retrieved business data;
        based on one or more parameters associated with the transformed business data, determining a contextual information associated with the transformed business data; and
        rendering the contextual information on a user interface to provision the contextual information associated with the business data; and
    a federation framework associated with the framework middleware that executes one or more sequel queries on one or more tables stored in the plurality of databases and retrieves the business data via the real-time provisioning adapter framework.

2. The system of claim 1, further comprising: a metadata manager associated with the framework middleware to store metadata information associated with the business data stored in the plurality of databases.

3. The system of claim 1, further comprising: a data-provisioning manager, comprising:
    a change data adapter component to read log information associated with the plurality of databases;
    a change data services component to read log information associated with the plurality of databases and extract information associated with changed business data; and
    a data access service component to replicate the changed business data in real-time.

4. The system of claim 1, wherein the framework middleware executes a plurality of routines related to web content management service, document management service, dashboard management service, widget management service and workflow management service.

5. The system of claim 1, wherein the framework middleware executes the plurality of routines to validate the business data from the plurality of business management systems using one or more local business rules.

6. The system of claim 1, wherein the framework middleware executes the plurality of routines to encrypt the business data by a sequential data encryption algorithm.

7. A computer-implemented method to provision contextual information associated with business data, comprising:
    receiving a request to establish a connection at a framework middleware via an application;
    upon processing the request, the application establishing a connection with a plurality of databases associated with a plurality of business management systems via an adapter framework associated with the framework middleware;
    based on the established connection, retrieving business data from the plurality of databases via a real-time provisioning adapter framework associated with the framework middleware;
    based on an execution of a plurality of routines in the framework middleware, triggering a system landscape transformation model to transform the retrieved business data;
    based on one or more parameters associated with the transformed business data, determining a contextual information associated with the transformed business data;
    rendering the contextual information on a user interface to provision the contextual information associated with the business data;

executing, via a federation framework associated with the framework middleware, one or more sequel queries on one or more tables stored in the plurality of databases; and retrieving the business data via the real-time provisioning adapter framework.

8. The computer-implemented method of claim 7, further comprising: storing, by a metadata manager associated with the framework middleware, metadata information associated with the business data stored in the plurality of databases.

9. The computer-implemented method of claim 7, further comprising:

reading log information associated with the plurality of databases;

extracting information associated with changed business data; and replicating the changed business data in real-time.

10. The computer-implemented method of claim 7, wherein the framework middleware executes a plurality of routines related to web content management service, document management service, dashboard management service, widget management service and workflow management service.

11. The computer-implemented method of claim 7, wherein the framework middleware executes the plurality of routines to validate the business data from the plurality of business management systems using one or more local business rules.

12. The computer-implemented method of claim 7, wherein the framework middleware executes the plurality of routines to encrypt the business data by a sequential data encryption algorithm.

13. A non-transitory computer-readable storage medium tangibly storing instructions, which when executed by a computer, cause the computer to perform operations comprising:

receiving a request to establish a connection at a framework middleware via an application;

upon processing the request, the application establishing a connection with a plurality of databases associated with a plurality of business management systems via an adapter framework associated with the framework middleware;

based on the established connection, retrieving business data from the plurality of databases via a real-time provisioning adapter framework associated with the framework middleware;

based on an execution of a plurality of routines in the framework middleware, triggering a system landscape transformation model to transform the retrieved business data;

based on one or more parameters associated with the transformed business data, determining a contextual information associated with the transformed business data;

rendering the contextual information on a user interface to provision the contextual information associated with the business data;

executing, via a federation framework associated with the framework middleware, one or more sequel queries on one or more tables stored in the plurality of databases; and retrieving the business data via the real-time provisioning adapter framework.

14. The non-transitory computer-readable storage medium of claim 13, further comprising instructions, which when executed by the computer, cause the computer to perform operations, comprising: storing, by a metadata manager associated with the framework middleware, metadata information associated with the business data stored in the plurality of databases.

15. The non-transitory computer-readable storage medium of claim 13, further comprising instructions, which when executed by the computer, cause the computer to perform operations, comprising:

reading log information associated with the plurality of databases;

extracting information associated with changed business data; and replicating the changed business data in real-time.

16. The non-transitory computer-readable storage medium of claim 13, wherein the framework middleware executes a plurality of routines related to web content management service, document management service, dashboard management service, widget management service and workflow management service.

17. The non-transitory computer-readable storage medium of claim 13, wherein the framework middleware executes the plurality of routines to validate the business data from the plurality of business management systems using one or more local business rules.

* * * * *